United States Patent Office 3,748,329
Patented July 24, 1973

3,748,329
COMPOUNDS CONTAINING THE 2,4,6-TRIKETO-1,3,5-OXADIAZINE RING
Dietrich Liebsch, Leverkusen, Ernst Meisert, Leverkusen-Schlebusch, and Gerhard Stopp, Leverkusen, Germany, assignors to Bayer Aktiengesellschaft, Leverkusen, Germany
No Drawing. Continuation-in-part of application Ser. No. 612,358, Jan. 30, 1967. This application July 8, 1970, Ser. No. 53,277
Int. Cl. C07d 87/52
U.S. Cl. 260—244 R            1 Claim

ABSTRACT OF THE DISCLOSURE

Compounds containing the 2,4,6 - triketo-1,3,5-oxadiazine ring which may be prepared by reacting an organic diisocyanate with carbon dioxide in the presence of certain catalysts including phosphine or arsine catalysts are disclosed as well as porous and non-porous polymers based on the compounds containing the 2,4,6-triketo-1,3,5-oxadiazine ring. The compounds are prepared by saturating an organic polyisocyanate where the isocyanate groups have approximately equal reactivity with carbon dioxide and then catalyzing the reaction of the isocyanate with the carbon dioxide to yield the 2,4,6-triketo-1,3,5-oxadiazine derivative.

---

This application is a continuation-in-part of co-pending application Ser. No. 612,358, filed Jan. 30, 1967 and relates to compounds containing the 2,4,6-triketo-1,3,5-oxadiazine ring and more particularly to the derivatives of these compounds which contain free isocyanate groups as well as to polymeric compounds prepared by reacting the corresponding isocyanates with other reactants in order to prepare foams, coatings, elastomers and the like.

Slotta and Tschesche reported in Berichte 60, 1021 (1927) that methylisocyanate condensed with carbon dioxide to form 3,5-dimethyl-2,4,6-triketo-1,3,5-oxadiazine. Analogous reactions with other isocyanates have not been described and, indeed, common aromatic polyisocyanates, such as 2,4-toluylene diisocyanate, 2,4'-diphenyldimethane diisocyanate or 4-isocyanatomethyl isocyanate form uretdiones or isocyanurates. The polyisocyanates were expected to lead to polymeric materials as a result of chain-lengthening, cross-linking reactions, even if the reaction went as indicated by the Slotta and Tschesche report, which it did not. In fact, the reaction of methyl isocyanate with carbon dioxide is the only one that has been found in the literature and other analogous reactions with higher isocyanates have not heretofore been described.

It is, therefore, an object of this invention to provide compounds containing the 2,4,6 - triketo-1,3,5-oxadiazine ring which have free isocyanato groups. Another object of this invention is to provide organic diisocyanates based on the 2,4,6-triketo-1,3,5-oxadiazine ring where the isocyanate group is bonded to an organic radical attached to the nitrogen atoms of the oxadiazine ring. Another object of this invention is to provide a process for the preparation of isocyanates which contain a 2,4,6-triketo-1,3,5-oxadiazine ring. Another object of this invention is to provide polyurethane plastics which are based on organic polyisocyanates containing a 2,4,6-triketo-1,3,5-oxadiazine ring, including foams, coatings, elastomers and the like. Still another object of this invention is to provide masked isocyanates which have very stable groups, capable of yielding hard coatings and the like. Another object of this invention is to provide for carbodiimides, which contain also the 2,4,6-triketo-1,3,5-oxadiazine ring.

The foregoing objects and others which will become apparent from the following description are accomplished in accordance with the invention, generally speaking, by providing organic polyisocyanates containing the 2,4,6-triketo-1,3,5-oxadiazine ring as well as polyurethane, carbodiimide, and the like, derivatives thereof. Thus, this invention provides for the preparation of organic compounds having the 2,4,6-triketo-1,3,5-oxadiazine ring which may be represented by the general formula

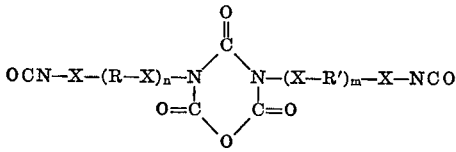

wherein

X is a lower but at least $C_2$ alkylene;
R and R' are the same or different and represent phenylene, methyl substituted phenyelne or $C_5$ to $C_6$ cycloalkylene;
n and m are the same or different and have a value of either 0 to 1;

which are prepared by reacting compounds having two or more aliphatically bound isocyanate groups of equal or similar reactivity, if desired in conjunction with an organic monisocyanate with carbon dioxide. The reaction can be cared out by mixing the isocyanate or mixture of isocyanates with carbon dioxide in a first step and then catalyzing the reaction to form the 2,4,6-triketo-1,3,5-oxadiazine ring compound. The aromatic polyisocyanates do not react with carbon dioxide under the conditions set forth below and, in fact, inhibit the 2,4,6-triketo-1,3,5-oxadiazine ring formation in the presence of isocyanates which would otherwise be capable of it. In such cases, polymers with an isocyanurate linkage are formed. According the the process of this invention it is necessary to use a catalyst and preferably a trisubstituted arsine oxide, a trialkyl phosphine or a mixed aliphatic aromatic phosphine as a catalyst for the reaction. Any suitable catalyst which will cause the formation of the 2,4,6-triketo-1,3,5-oxdiazine ring may be used but these are the preferred types of catalyst for the rapid formation of the compounds of the invention.

Suitable radicals represented by X, R and R' in the above formula are aliphatic radicals such as, for example, methylene, ethylene, n-propylene, isopropylene, n-butylene, isobutylene, sec-butylene, t-butylene, n-pentylene, methylbutylene, dimethylpropylene, ethylpropylene and the various positional isomers thereof, including the corresponding straight and branched chain isomers of hexylene, heptylene, octylene, monoylene, decylene, undecylene, dodecylene, tetradecyl, hexadecyl, octadecyl, eicoxyl, and the like; cycloaliphatic radicals, such as for example cyclopentyl, cyclohexyl, and the like; aromatic radicals, such as, for example phenylene, o-methylphenylene and the like.

Only substantially pure aliphatic polyisocyanates having isocyanate groups of equal or similar reactivity can be used as starting materials for the preparation of the 2,4,6-triketo-1,3,5-oxadiazine ring compounds of the invention. Some aliphatic polyisocyanates suitable for use according to the invention are, for example, ethylene diisocyanate, propylene diisocyanate, 1,3-butylene diisocyanate, 1,4-tetramethylene diisocyanate, pentylene diisocyanate, 1,6-hexamethylene diisocyanate, methylbutylene diisocyanate, heptamethylene diisocyanate, 1,8-octamethylene diisocyanate, 2,2-dimethylpentylene diisocyanate, 2,2-dimethyl-1,5-pentamethylene diisocyanate, 2,2,4-trimethylpentylene diisocyanate, decamethylene diisocyanate, undecamethylene diisocyanate, dodecamethylene diisocyanate and the like.

Araliphatic diisocyanates and cycloaliphatic diisocyanates are also suitable for use in the invention, provided, however that there be at least two methylene groups between the isocyanate group and the aromatic or cycloaliphatic ring structure. Some suitable araliphatic and cycloaliphatic diisocyanates are for example, 1,4-diethylenzene-2,2'-diisocyanate,
4,6-diethylbenzene-1,3-dimethyl-2,2'-diisocyanate,
1,4-b-isocyanatoethyl cyclohexane,
1,5-b-isocyanatoethylcyclopentane and the like.

It is also possible to use the biuret diones formed from the above-mentioned aliphatic diisocyanates as starting materials for the preparation of the 2,4,6-triketo-1,3,5-oxadiazine ring compounds. Further, the above-mentioned polyisocyanates may be mixed with aliphatic monoisocyanates to prepare the compound of the invention having different isocyanate contents. Some suitable aliphatic monoisocyanates are for example, methylisocyanate, ethylisocyanate, propylisocyanate, isopropylisocyanate, allylisocyanate, butylisocyanate, isobutylisocyanate, sec-butylisocyanate, tert-butylisocyanate, amylisocyanate, hexylisocyanate, 6-chlorohexylisocyanate, 3-methoxypropylisocyanate, oleylisocyanate, sterylisocyanate, tetradecylisocyanate, chlorodecylisocyanate, phenylethylisocyanate and the like.

Examples of suitable catalysts which may be used include the tertiary aliphatic and mixed aliphatic aromatic phosphines such as triethyl phosphine, tributyl phosphine, tribenzyl phosphine, dimethyl benzyl phosphine, dimethyl phenyl phosphine, parabutyl phosphacyclopentane and arsine oxides trisubstituted by alkyl or aryl radicals such as tri-n-butyl arsine oxide, dibutyl phenyl arsine oxide, tri-p-tolylarsine oxide, tri-p-chlorophenylarsine oxide and the like.

Any suitable amount of the catalyst may be used, but it is preferred to use from about 0.01 percent by weight to about 10 percent by weight and preferably about 0.1 percent to about 1 percent by weight is used based on the weight of the reaction mixture.

The preparation of the initial organic compound containing the 2,4,6-triketo-1,3,5-oxadiazine ring can be carried out either with or without solvents by saturating a polyisocyanate of the type set forth above or its solution with carbon dioxide and initiating the reaction by the addition of the catalyst, preferably with rapid stirring. The carbon dioxide concentration should be kept as high as possible by continuously introducing further carbon dioxide which dissolves in surprisingly large quantities in the polyisocyanates or their solutions. The desired carbon dioxide concentration can also be maintained by the addition of solid carbon dioxide. Further, it is possible to carry out the process in autoclaves or pressure vessels under a carbon dioxide pressure of, for example, 5 atmospheres above atmospheric pressure, but this does not lead to any significant advantages.

The reaction will take place over a wide temperature range, but it is preferred to carry the reaction out at a temperature of about $-50°$ C. to about $150°$ C. and it is most preferred to work at temperatures of about $40°$ C. to about $100°$ C. because at higher temperatures the carbon dioxide concentration in the reaction solution decreases and other competing reactions such as the formation of isocyanurates, carbodiimides, as well as compounds formed from these derivatives take place to an increasing extent.

Accordingly, if the reaction is carried out as indicated above preferably at a temperature of about $40°$ C. to about $100°$ C. the compounds containing the 2,4,6-triketo-1,3,5-oxadiazine ring will constitute the main product. The 2,4,6-triketo-1,3,5-oxadiazine ring is evident from infra red spectra that show a sharp absorption at 5.50 microns which is characteristic of the carbonyl group of the oxadiazine ring formed from carbon dioxide together with a second band at 5.70 microns which is characteristic of the acid anhydride group, —CO—O—CO—, and another carbonyl vibration at 5.83 microns. The oxidiazine ring clearly absorbs at 6.95 and 7.09 microns.

One may also obtain carbon dioxide for carrying out the reaction by generating it in situ by reaction of part of the isocyanate groups with carboxylic acid, water or other compounds which give off water and form carbon dioxide. This renders the process of the invention particularly economical and it enables the reaction of aliphatic polyisocyanates to be carried out in closed apparatus since the carbon dioxide formed does not give rise to any excess pressure and therefore need not be released. This sort of reaction has heretofore only been possible under considerable technical difficulties. The purification of waste gas which can only be carried out with difficulty is thereby reduced to insignificant proportions.

The progress of the reaction can be followed by following the reduction of the —NCO content of the starting isocyanate. While the reaction can be continued until high molecular weight synthetic resins are formed, which resins are distinguished by their high strength and notched impact resistance, it is possible to obtain low molecular weight oxadiazine derivatives of clearly defined constitution. If low molecular weight derivatives are desired then the reaction should be stopped before half of the original isocyanate has undergone reaction, i.e. before the isocyanate group content has fallen to less than 60 percent of the initial value. This can be accomplished by inactivating the catalyst and separating the unreacted monomeric isocyanate by thin layer evaporation, direct distillation or extraction. The monomeric isocyanate may be used in a fresh reaction mixture.

Any suitable compound capable of inactivating the catalyst may be used. Compounds which have an acylating effect are preferably used to inactivate the catalyst and stop the reaction. Suitable alkylating agents are dimethylsulphate, methyl iodide, toluene sulphonic acid ester and the like, suitable acrylating agents are benzoyl chloride, chloroformic acid esters, dimethylcarbamic acid chlorides and the like. When arsenic containing catalysts are being used it is better to use phosphorous trichloride, phosphorous oxychloride, boron trifluoride etherate or triethyloxonium fluoroborate to stop the reaction.

One advantage of stopping the reaction before it has proceeded too far is that low molecular weight liquids of medium viscosity are obtained which have free isocyanate groups, therefore, substantially no toxicity exists in these compounds due to vapor pressure of the isocyanate. Moreover, these isocyanate when reacted with organic compounds containing active hydrogen containing groups as more fully disclosed below, yield products having improved thermal stability and improved resistance to burning. The 2,4,6 - triketo - 1,3,5 - oxadiazine ring is more stable than the uretdione group or the urethane group and, in fact, these compounds can be heated up to $220°$ C. without carbon dioxide being split off from the 2,4,6 - triketo - 1,3,5 - oxadiazine ring. The initial compounds are readily soluble in a large number of inert organic solvents such as esters, ketones and chlorinated hydrocarbons and, as will be more fully demonstrated below, are usefully and valuable because they are physiologically harmless owing to their insignificantly small vapour pressure, while at the same time they have a highly reactive isocyanate group content. Coatings based on these organic isocyanates have a low toxicity and high fastness to light, particularly when used as adhesives, hardeners for polyesters and polyether lacquers, and the like.

The initial reaction products prepared by reacting an aliphatic diisocyanate or a mixture thereof with a monisocyanate with carbon dioxide are after mixtures of compounds which may contain several 2,4,6 - triketo - 1,3,5-oxadiazine rings. These mixtures contain many different compounds and are best defined as reaction products of the isocyanate with the carbon dioxide. However, some compounds can be defined from the mixtures and these too are part of the invention, i.e. 3,5 - bis - (6 - isocyanto-n-hexyl - 2,4,6 - triketo - 1,3,5 - oxadiazine, 3-(6-chlorohexyl) - 5 - (6 - isocyanatohexyl) - 2,4,6 - triketo - 1,3,5-oxadiazine (see formula in Example 8).

The formation of some of the simpler compounds of the invention are illustrated by the following general reaction mechanism:

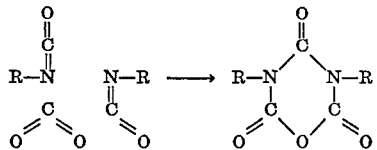

wherein R is an aliphatic radical and at least one R and preferably both contain a free —NCO group, i.e. "R" is preferably obtained by removing the —NCO group from an aliphatic mono-or diisocyanate.

The invention also contemplates polyurethane plastics which are prepared by reacting the polyisocyanates of the invention containing a 2,4,6 - triketo - 1,3,5 - oxadiazine ring with an organic compound containing active hydrogen containing groups as determined by the Zerewitinoff method.

Generally speaking, any compound having an active hydrogen atom as defined above which will react with an —NCO group may be used. Hydroxyl groups react with —NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used active hydrogen containing compounds are contemplated which may contain any of the following types of active hydrogen containing groups, among others, —OH,

—NH$_2$

—NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,5-pentane diol, 1,2-propylene glycol, 1,4-butylene glycol, 1,3-butylene glycol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be difunctional compound including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used but the phosphorous compounds are somewhat peculiar in that a different mode of preparation may be required, as more particularly set forth below. The resulting polyhydric polyalkylene ethers with the various bases of nitrogen, phosphorus and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Pats. 1,922,459; 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylolpropane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p"-triphenylmethane triamine, ethylene diamine, propylene diamine, propylene triamine, N,N,N',N'-tetrakis-(2-hydroxypropyl) ethylene diamine, diethylene triamine and the like. The phosphorus containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Pats. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butane diol, 1,3-butylene glycol, 1,5-pentane diol, 1,3-pentane diol, 1,6-hexane diol, 1,7-heptane diol, 2,2-dimethyl-1,3-propane diol, 1,8-octane diol and the like; including 1,20-eicosane diol and the like; alkene diols such as, for example, 1-butene-1,4-diol, 1,3-butadiene-1,4-diol, 2 - pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetraamine and the like; aliphatic polyamines such as, for example, ethylene diamine, 1,3-propylene diamine, 1,4-butylene diamine, 1,3-butylene diamine, diethyl triamine, triethylene tetraamine, 1,3,6-hexane triamine, 1,3,5,7-heptane tetraamine and the like; heterocyclic polyamines such as, for example, 2,6-diamino pyridine, 2,4-diamino-5-aminomethyl pyrimidine, 2,5-diamino-1,3,4-thiadiazol and the like.

Phosphorus containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Pat. 3,009,929 where triphenyl phosphite, for example, is reacted with a polypropylene ether glycol to prepare a product having a molecular weight of about 500. Other processes are disclosed in the patent. It is also possible to use polyethers based on phosphorus which contain nitrogen atoms in addition to the phosphorous atoms. These compounds may be represented by the general formula

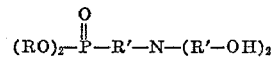

wherein R is lower alkyl or phenyl, for example, methyl, ethyl, propyl, butyl and the like and R' is alkylene, preferably having from 1 to 4 carbon atoms such a methylene, ethylene, 1,2-propylene, 1,4-butylene and the like. A preferred compound is dioxyethylene - N,N-bis-(2-hydroxyethyl)aminomethyl phosphonate.

Any of the compounds of any of the classes set forth above may be substituted with halogen such as, for example, chloro, bromo, iodo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, dipropyl amino, methylethyl amino and the like; mercapto, carbonyl, thiocarbonyl, phosphoryl, phosphato and the like.

In the production of the polyurethane plastics of the invention any suitable organic polyisocyanate may be mixed with the isocyanate containing the 2,4,6-triketo-1,3,5-oxadiazine ring. Suitable organic polyisocyanates are, therefore, ethylene diisocyanate, ethylidene diisocyanate, propylene-1,2-diisocyanate, cyclohexylene-1,2-diisocyanate m-phenylene diisocyanate, 2,4-tolylene diisocyanate, 2,6 - tolylene diisocyanate, 3,3'-dimethyl-4,4'-biphenylene diisocyanate, 3,3' - dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p" - triphenylmethane triisocyanate, 1,5-naphthalene diisocyanate, furfurylidene diisocyanate or polyisocyanates in a blocked or inactive form such as bisphenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

The polyisocyanates of the invention are useful for the preparation of cellular polyurethane plastics by reaction thereof with an active hydrogen containing compound in the presence of a blowing agent. Suitable processes for the preparation of cellular polyurethane plastics are disclosed in U.S. Reissue Pat. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free —NCO groups which is then reacted in a second step with water to prepare a foam. Alternately, the components may be reacted in a single step. Furthermore, instead of water, low boiling hydrocarbons such as pentane, hexane, heptane, pentene, heptene and the like; azo compounds such as azohexahydrobenzodinitrile and the like, halogenated hydrocarbons such as dichlorodifluoroethane, dichlorodifluoromethane, trichlorofluoromethane, vinylidene chloride, methylene chloride and the like may be used as blowing agents. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Pat. 2,834,748. Where polyhydrice polyalkylene ethers are included in the reaction mixture to prepare a cellular polyurethane plastic, it is preferred to employ a silicone oil of the above patent within the scope of the formula

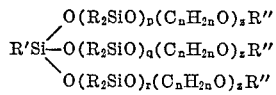

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

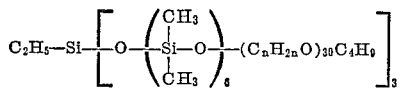

wherein $(C_nH_{2n}O)_z$ is a mixed polyoxyethylene and oxypropylene block copolymer containing about 17 oxyethylene units and about 13 oxypropylene units. Other suitable stabilizers are disclosed in Canadian Pats. 668,-537; 668,478 and 670,091. Other suitable compounds may therefore have the formula

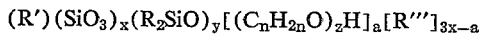

where $x$ is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that method of determining the chain length of the polysiloxane chains and the polyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula R₃Si— where R is monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

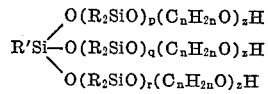

where $p+q+r$ has a minimum value of 3, the other subscripts being the same as in the immediately foregoing formula. In this instance, all three of the oxyalkylene chains are joined to the end of polysiloxane chains of the type $—(R_2SiO)—$. Specifically, one could use

Any suitable catalyst may be used to speed up the reaction if desired such as, for example, dimethyl benzyl amine, dimethyl stearyl amine, permethylated diethylene triamine, N-methyl-N'-dimethylaminoethyl piperazine, N,N'-endoethylene piperazine, N-alkyl morpholines; tertiary aminoethers such as, for example, 1-alkoxy-3-dialkylamino-propane, tertiary amines with ester groups, salts of tertiary amines, especially with organic acids such as, for example, oleic acid, benzoic acid, and the like; dibutyl tin dilaurate, dibutyl tin di-2-ethyl hexoate, dibutyl-tin-bis-(dimethylamino caproate), stannous octoate, stannous oleate, lead naphthenate, ferric acetylacetonate, mixtures thereof and any other catalyst which will promote the reaction between isocyanate groups and active hydrogen atoms as determined by the Zerewitinoff method as those disclosed in "Catalysis of the Isocyanate-Hydroxyl Reaction," by J. W. Britain and P. G. Gemeinhardt. Journal of Applied Polymer Science, vol. IV, issue No. 11, pp. 207–211 (1960).

The polyisocyanates of the invention may also be used for the production of coating compositions. In this case, the organic compound containing active hydrogen containing groups is reacted with the polyisocyanates of the invention in an inert organic solvent therefor, such as, for example, ethyl acetate, methyl formamide, the diethyl ether of diethylene glycol, benzene, xylene, benzine and the like.

Castings which are elastomeric in nature or which are rigid like concrete may be prepared in accordance with the invention by mixing them with an organic compound containing active hydrogen containing groups and according to the fuctionality of the compound preparing either flexible or rigid typecastings.

The compounds of the invention are also useful to prepare masked isocyanates by the reaction thereof with an organic compound having one active hydrogen containing group as determined by the Zerewithinoff method which will split off at a relatively low temperature above about 80 to 100° C. The preferred compound of this type is phenol but any other suitable compound which will act in the same way may be used. These compounds preferably have the formula

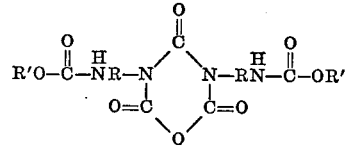

wherein R' is obtained by removing the hydroxyl group from a phenol which has only one aromatic hydroxyl group and R is obtained by removing the —NCO groups from an aliphatic diisocyanate.

The compounds containing free —NCO groups and the 2,4,6-triketo-1,3,5-oxadiazine ring are useful for the preparation of polyurethane coatings for wood, metals and the like. The polyurethanes may also be used in moldings such as gear wheels. The foamed polyurethanes are useful as cushions as well as for insulation. The monoisocyanates of the invention can be used as reactive modifiers for plastics and are useful for insecticides and the like.

The invention is further illustrated by the following examples in which the parts are by weight unless otherwise indicated.

EXAMPLE 1

About 336 g. of 1,6-hexamethylene diisocyanate (hydrolyzable chlorine content less than 0.01%) are saturated with $CO_2$ by the addition of about 30 g. of solid carbon dioxide and heated to about 60° C. while a slow stream of carbon dioxide is passed through. The reaction is initiated by the addition of about 1.7 g. (0.5%) of tri-n-butylphosphine and stopped after about 70 minutes when an NCO value of about 41.8% is reached by addition of about 1.5 g. of dimethylsulphate. Unreacted monomer is removed by passing the reaction mixture twice through a thin layer evaporator (heating temperature about 180° C. at 1 mm. Hg). About 232 g. of 1,6-hexamethylene diisocyanate are recovered and about 92 g. of a yellowish oil of low viscosity containing less than about 0.5% of hexamethylene diisocyanate is isolated as reaction product. The NCO value is approximately about 21.3%, the molecular weight is about 412 (theoretical: 22.1% NCO, molecular weight 380). In the IR spectrum, bands characteristic of 2,4,6-triketo-1,3,5-oxadiazine structures are found at 5.5–5.72–5.84–6.95 and 7.08μ.

*Analysis* (percent): C, 53.9; H, 6.8; N, 14; 8; O, 24.1 (theory (percent): C, 53.7; H, 6.3; N, 14.7; O, 25.3).

EXAMPLE 2

About 240 g. of 1,6-hexamethylene diisocyanate are dissolved in about 336 g. of ethyl acetate, the solution is saturated with carbon dioxide as described in Example 1 and after it has been heated to about 60° C. about 1.5 g. of triethylphosphine are added. After aobut 7.5 hours, the NCO content of the solution reaches a value of about 21.7%. The reaction is stopped by the addition of about 2 g. of dimethylsulphate and the solvent is distilled off. The liquid residue is freed from excess unreacted 1,6-hexamethylene diisocyanate as in Example 1. About 145 g. of hexamethylene diisocyanate are recovered and about 87 g. of a viscous yellow oil isolated which shows in the IR spectrum characteristic bands for 2,4,6-triketo-1,3,5-oxadiazines at 4.4–5.48–5.71–5.83–6.93 and 7.07μ. The NCO value is about 19.0%, the free 1,6-hexamethylene diisocyanate content about 0.4%.

EXAMPLE 3

About 280 g. of 1,4-tetramethylene diisocyanate are satuarted with dry $CO_2$ gas and about 0.7 g. of tri-n-butyl phosphine (0.25%) is added at about 60° C. while further carbon dioxide is passed through while the mixture is stirred. The NCO value has dropped to about 53.8% after about 2 hours. The reaction mixture is separated in a thin layer evaporator as in Example 1. About 219 g. of 1,4-tetramethylene diisocyanate being recovered in this operation, and about 54 g. of a viscous oil obtained. This shows the characteristic bands in the IR spectrum for 2,4,6 - triketo - 1,3,5 - oxadiazines containing isocyanate groups (4.4–5.48–5.71–5.83–6.93–7.06μ) has an NCO value of about 20.2% and a molecular weight of about 375.

*Elementary analysis* (percent): C, 48.9; H, 5.5; N, 17.4; O, 27.1.

EXAMPLE 4

About 1.0 g. of tri-p-tolylarsine oxide is added to about 2000 g. of 1,6-hexamethylene diisocyanate in a 2.7 liter autoclave and the mixture stirred for about 8 hours at a carbon dioxide pressure of about 3 atmospheres above atmospheric pressure and about 50° C. About 17.5 liters of carbon dioxide are taken up in this operation. The reaction is stopped by the addition of about 2 g. of phosphorous trichloride and the reaction mixture separated in a thin layer evaporator as described in Example 1. About 1957 g. of 3,5 - bis - (6-isocyanato-n-hexyl)-2,4,6-triketo-1,3,5-oxadiazine which has an NCO value of about 19.0% and a viscosity of about 2480 cp./50° are obtained. The non-volatile hexamethylene diisocyanate content is in the region of about 0.3%. The IR spectrum shows the characteristic carbonyl absorptions at 5.50–5.71 and 82μ

EXAMPLE 5

A mixture of about 168 g. of 1,6-hexamethylene diisocyanate and about 99 g. of butylisocyanate is saturated with carbon dioxide as in Example 1 and activated with about 4 g. of tri-n-butylphosphine at about 60° C. After the NCO value has dropped from about 47.1% to about 42.2% within about 3 hours, the reaction is terminated by the addition of about 3 g. of dimethylsulphate and the reaction mixture is separated by means of a thin layer evaporator as described in Example 1. In this operation, about 219 g. of monomeric isocyanates are recovered as distillate and about 32 g. of a 2,4,6-triketo-1,3,5-oxadiazine derivative with various substituents which has an NCO value of about 16.4% and shows the usual bands in the IR spectrum at 5.48–5.71 and 5.83μ is obtained.

EXAMPLE 6

About 500 g. of 1,6-hexamethylene diisocyanate are treated with about 50 g. of solid carbon dioxide and heated to about 60° C. while dry carbon dioxide is passed in. The reaction is initiated by the addition of about 0.5 g. of triphenylarsine oxide until, after about 7 hours stirring at about 60° C. the reaction mixture is left to stand at room temperature for approximately a further 16 hours, when the NCO value has dropped to about 40.6%. The reaction is stopped by adding about 1 g. of phosphorous trichloride and heating for a short while to about 100° C., the reaction mixture being extracted with petroleum ether (boiling range about 80 to 120° C.) in a liquid-liquid extractor until the solvent running off is free from titratable isocyanate. The liquid polymer is removed and freed from traces of extracting agent by heating it for a short while in vacuo. About 167 g. of a slightly yellowish polymer are obtained which only contains hexamethylene diisocyanate in traces and has an NCO value of about 22.0%.

In addition to the characteristic bands for 2,4,6-triketo-1,3,5-oxadiazine derivatives at 5.5—5.72 and 8.83μ, the IR spectrum also showed an absorption at 5.94μ, indicating small quantities of the isocyanurate as by-product.

EXAMPLE 7

About 1.2 parts of tri-n-butyl phosphine are added to about 378 parts of 1,6-hexamethylene diisocyanate and 36.5 parts of anhydrous adipic acid are introduced into the mixture. The mixture is then heated in a closed stirrer-type apparatus with stirring and the temperature is adjusted between about 60° C. and about 80° C. so that the carbon dioxide evolved in the reaction occurring between the isocyanate and the carboxylic acid groups is consumed in the concurrently proceeding reaction yielding 2,4,6-triketo-1,3,5-oxadiazine derivatives, and a carbon dioxide pressure of about 1.5 atmospheres is not exceeded. After about six hours the temperature is raised to about 100° C. for about 30 minutes, excess unreacted carbon dioxide is released from pressure and the phosphine catalyst is deactivated by the addition of about 1 part of dimethylsulfate. The reaction mixture has then a NCO content of about 40.0% and is freed from excess 1,6-hexamethylene diisocyanate in a thin layer evaporator at about 150° C. and 2 mm./Hg, nitrogen being passed in at the lower part of the evaporator as entrainer gas. There are obtained about 272 parts of excess 1,6-hexamethylene diisocyanate and about 108 parts of a highly viscous liquid of an NCO content of 90.7%, which has only poor flowing properties at room temperature. Besides the absorption at 5.70 to 5.82μ, which are characteristic for the 2,4,6-triketo-1,3,5-oxadiazine rings, the IR spectrum shows intensive absorption bands at 3.0 and 5.9 which is due to the proportion of carbonamide structures.

EXAMPLE 8

About 84 parts of 1,6-hexamethylene diisocyanate and about 161 parts of 6-chlorohexyl isocyanate are saturated by addition of about 100 parts of solid carbon dioxide and stirred at about 60° C. after addition of about 2 parts of tri-n-butylphosphine. By introducing $CO_2$ a uniform carbon dioxide concentration is achieved in the reaction mixture and the reaction is continued until the NCO content has dropped from about 34.5 to about 26% after about 8 hours. The reaction is then stopped by the addition of about 1.65 parts of dimethyl sulfate and heating to about 100° C. for about 30 minutes, and unreacted monomeric isocyanates are removed by thin layer distillation at about 185° C. and 2 mm./Hg, a slow current of nitrogen being passed through as entrainer.

There are obtained (a) About 188 parts of a distillate which, according to the gas phase chromatographical analysis, consists of about 70% of 6-chloro-hexyl-isocyanate and of about 29.5% of 1,6-hexamethylene diisocyanate;

(b) About 55 parts of 3-(6-chlorohexyl)-5-(6-isocyanato hexyl)-2,4,6-triketo-1,3,5 - oxadiazine, a yellowish slightly viscous liquid, which can be defined by the following analytical data; NCO content: 11.0% (calculated 11.2%), chlorine content: 9.3% (calculated 9.4%), molecular weight: 480 (calculated 374).

The compound is clearly identified in the IR spectrum with intensive absorption bands at 5.48 to 5.70 and 5.38μ as a 2,4,6-triketo-1,3,5-oxadiazine which substantially corresponds to the following formula:

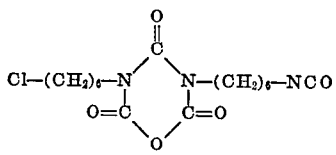

EXAMPLE 9

About 1000 parts of 1,6-hexamethylene diisocyanate are saturated with carbon dioxide by stirring in a pressure vessel which was previously thoroughly rinsed with carbon dioxide. By heating to about 240° C. and adding about 4 parts of tri-n-butyl-phosphine the reaction is then initiated until the NCO content has dropped from about 50% to about 36% within about 5¼ hours. About 2 parts of dimethylsulfate are then added to the mixture, the carbon dioxide is released from pressure and the mixture is heated to about 100° C. for about 30 minutes. Unreacted 1,6-hexamethylene diisocyanate is then removed by passing the reaction mixture twice through a thin layer evaporator at about 100° C. and 0.8 mm./Hg. There are obtained about 572 parts of 1,6-hexamethylene diisocyanate and about 426 parts of a high molecular weight polyisocyanato oxadiazine trione, a viscous liquid of an NCO content of 18.8%.

EXAMPLE 10

The catalysts which are suitable for carrying out the reaction differ clearly in their activity but not in their reactivity. The IR spectra of the reaction products are equal in all cases. The table below indicates the relative catalytical activity of some tertiary phosphines of the aliphatic or mixed aliphatic-aromatic series. In all the experiments compiled in the table below about 100 g. of 1,6-hexamethylene diisocyanate are activated with the catalyst after addition of about 20 g. of solid carbon dioxide at 60° C. and kept under a carbon dioxide pressure of 1.2 atmospheres.

| Catalyst | Amount in mg. | Amount in mmol | NCO value after 4½ hours (percent) |
| --- | --- | --- | --- |
| Tri-n-butyl-phosphine[1] | 300 | 1.5 | 41.3 |
| Tri-ethylphosphine | 292 | 2.5 | 48.0 |
| Do. | 876 | 7.5 | 25.3 |
| Tricyclohexylposphine | 3500 | 12.5 | 42.7 |
| Phenyldimethylphosphine | 1710 | 12.5 | 48.6 |

[1] At 40° C.

EXAMPLE 11

The 2,4,6 - triketo-1,3,5-oxadiazine of 1,6-hexamethylene diisocyanate obtained according to Example 1 exhibits excellent film-forming properties, as can be seen from the following experiment.

Besides the 2,4,6-triketo-1,3,5-oxadiazine of 1,6-hexamethylene diisocyanate, there is used a polyester of phthalic acid and trimethylolpropane with 8% OH groups and a solvent consisting of a mixture of methylethylketone, butylacetate, ethylglycol etheracetate and toluene in the ratio 3:1:3:1, as well as titanium dioxide of the rutile type as pigments. The amounts of the components are given in the following table:

| Recipe | I | II | III | IV |
| --- | --- | --- | --- | --- |
| Polyester 50% in a mixture of methylethylketone, butylacetate, ethylglycoletheracetate and toluene | 200 | 200 | 200 | 200 |
| Methylethylketone, butylacetate, ethylglycol-etheracetate and toluene | 358 | 358 | 358 | 358 |
| Titanium dioxide | | | 87 | 87 |
| Zinc octoate 10% in a mixture of methylethylketone, butylacetate, ethylglycoletheracetate and toluene | | 4 | | 4 |
| 2,4,6-triketo-1,3,5-oxadiazine of 1,6-hexamethylene diisocyanate (100%) | 98 | 98 | 98 | 98 |
| Stoichiometrical cross-linking (percent) | 100 | 100 | 100 | 100 |
| Binder content (percent) about | 30 | 30 | 26.7 | 26.7 |
| Pot life (hours) about | 10 | 7 | 10 | 7 |
| Film drying, about | 16 | 3 | 16 | 3 |
| Pendulum hardness according to Alber Koenig after 7 days (sec.) | 188 | 136 | 190 | 135 |
| Stability to toluene after 14 days | + | + | + | + |
| Elasticity on sheet steel as impression with the Erichsen device after 1 month | 8.9 | 9.1 | 8.9 | 9.1 |

In the brief weathering in the Weather-O-Meter the luster and shade of the films obtained with the recipies III and IV are completely unchanged after 1600 hours.

EXAMPLE 12

About 19 parts of phenol are added dropwise at about 15 to 16° C. to about 39 parts of the compound prepared according to Example 1 and the mixture is stirred at about 60° C. for another 12 hours. The resulting reaction product yields a highly viscous liquid containing the originally present isocyanate groups in form of a phenol urethane, that means a compound yielding isocyanate.

Upon mixing with hydroxyl compounds and amines containing weak base only, there are obtained stable systems which become reactive only upon heating to about 80 to 150° C. Together with the hydroxyl compounds or amines, the isocyanate groups formed by splitting off phenol yield urethanes or ureas, while the carbamic acid formed by splitting up the 2,4,6-triketo-1,3,5-oxadiazine ring yields allophanates or biurets.

By mixing the aforesaid reaction product for example with a mixture of 1,6-diethylene glycol and about 100 parts of a linear polypropylene glycol (OH number 56, molecular weight 2000) and briefly heating to about 120° C., the mixture reacts to produce an elastic foam.

By applying the stable highly viscous mixture onto a fabric in a thin layer, an elastic fabric coating which is fast to light is obtained after heating to about 120° C.

EXAMPLE 13

About 21 parts of dioxyethylamine are slowly added dropwise to about 78 parts of the compound prepared according to Example 1 in such a manner that a temperature of about 50° C. is not exceeded by the reaction heat evolved. By heating the primary addition product, which is stable on storage, to about 120 to 150° C., a reaction occurs with cross-linking to yield a hard and vary viscous foam.

EXAMPLE 14

About 262 parts of a linear polyester of adipic acid and ethylene glycol (OH number about 55, molecular weight about 2000) are melted and about 48 parts of the 2,4,6-triketo-1,3,5-oxadiazine prepared according to Example 1 are added with stirring at about 50° C. The reaction is allowed to proceed at about 50° C. for about 24 hours until the NCO contant of the mixture has disappeared almost completely. Evolution of carbon dioxide does not occur; the prepolymer still contains, as is shown by the IR spectrum, all of the 2,4,6- triketo-1,3,5-oxadiazine groups unchanged and solidifies at room temperature to a wax-like mass which is stable on storage. By heating the mass to about 120 to 150° C. cross-linking occurs with the evolution of carbon dioxide and an elastic high molecular weight foam is obtained.

When using in the above reaction, instead of the polyester, about 247 parts of a polypropylene glycol of the molecular weight 2000, OH number 56, a highly viscous, slightly turbid liquid is obtained upon heating to about 50° C. for about 24 hours. Prolonged heating at about 150° C. leads to cross-linking and the formation of an elastic plastic.

EXAMPLE 15

About 100 parts of the 2,4,6-triketo-1,3,5-oxadiazine derivative prepared according to Example 1 are stirred at about 60° C. for about 12 hours with the addition of about 1 part of tri-n-butyl-phosphine and then left standing overnight. The NCO content of the product drops from about 21.3% to about 15.3% and a yellowish, highly viscous liquid is formed which can be stabilized by heating to about 100° C. for about 30 minutes, with the addition of about 1 part of dimethylsulfate. The polymerization reaction leads to a further increase in the molecular weight with the formation of isocyanurate rings without the oxadiazine trione structure being varied. Besides the bands at 5.48 to 5.68 and 5.81μ which are characteristic for the oxadiazine trione ring, the IR spectrum shows the carbonyl vibration of the isocyanurate ring at 5.91μ very intensely. The oxygen content is unchanged at about 24.1%, the compound is therefore likewise amendable to the reactions described in Examples 11 to 14, has a medium molecular weight 851 and contains at an average 3.1 NCO groups and 2.2 oxadiazine trione rings per molecule.

By adding in the above reaction a further amount of 0.5 part of tri-n-butyl-phosphine, instead of stopping the reaction by addition of dimethylsulfate, a hard viscous plastic is obtained within about 24 hours.

EXAMPLE 16

About 84 parts of the 2,4,6-triketo-1,3,5-oxadiazine prepared according to Example 1 from 1,6-hexamethylene diisocyanate; as well as about 140 parts of 2,4-toluylene diisocyanate are dissolved in about 224 parts of butylacetate and reacted with 2 parts of tri-n-butyl-phosphine at a temperature of about 80° C. while stirring, and about 3 hours after the reaction has set in with an equal quantity of tri-n-butyl-phosphine. When the NCO content in the mixture has dropped to 12% after about 6 to 7 hours, the viscosity of the solution begins to increase distinctly. At this stage of the reaction a mixed isocyanurate having 2,4,6-triketo-1,3,5-oxadiazine groups can be precipitated from the solution with petroleum ether and can be separated from unreacted 2,4-toluylene diisocyanate and the catalyst. When allowing the reaction to proceed without interruption, as solid insoluble plastic is obtained which shows in the IR spectrum the absorption bands at 5.5 to 5.7 to 5.82 to 5.82 and 7.05μ which are characteristic for isocyanurates.

EXAMPLE 17

About 42 parts of the 2,4,6-triketo-1,3,5-oxadiazine prepared according to Example 1 from hexamethylene diisocyanate are stirred with 0.25 part of triphenylarsine oxide at about 180° C. until one liter of carbon dioxide has been split off after about 1 hour. The reaction product is a viscous, yellowish-brown colored liquid containing the unaffected 2,4,6-triketo-1,3,5-oxadiazine structure as well as carbodiimide groups in the amount according to that of the carbon dioxide split up; the carbodiimide groups become visible in the IR spectrum by an intensive absorption band at 7.4μ.

By allowing the reaction to proceed for about 3 hours until about 2.2 to about 2.5 liters of carbon dioxide are separated, the mixture solidifies to a highly cross-linked solid and brittle mass the IR spectrum of which shows the oxadiazine trione ring which is still unaffected. Instead of carbodiimide groups, the spectrum shows the secondary products thereof, the urethane imides which are formed by addition of excess isocyanate.

EXAMPLE 18

2,4,6-triketo-1,3,5-oxadiazine are capable of stabilizing the thermal degradation of polyurethane/elastomer solutions in organic solvents as is shown in the following experiment.

About 500 parts of a polyester of ethylene glycol/adipic acid (OH number 56) and about 500 parts of a polyester of diethylene glycol/adipic acid (OH number 41) are mixed with about 75 parts of toluylene diisocyanate (mixture of the 2,4-isomers and the 2,6-isomers in the ratio 65:35) and heated at about 130° C. for about 17 hours. The resulting polyurethane elastomer is comminuted and dissolved in ethylacetate to yield about 31% solution of about 300 $P_{20}°$.

By heating the solution to the boil for about 40 hours the polyurethane can be degraded to such an extent that the falling ball time in the falling sphere-type viscosimeter is decreased by about 65%. By adding about 2 parts of the 2,4,6-triketo - 1,3,5 - oxadiazine prepared according to Example 1 from 1,6-hexamethylene diisocyanate to the reaction mixture, any thermal degradation cannot be determined in a comparison showing after heating the ethylacetate solution to boiling temperature for about 40 hours.

It is to be understood that the foregoing examples are given for the purpose of illustration and that any other suitable isocyanate, catalyst, active hydrogen containing compound or the like could be used therein provided that the teaching of this disclosure is followed.

Although the invention has been described in considerable detail in the foregoing, it is to be understood that such detail is solely for the purpose of illustration and that many variations can be made by those skilled in the art without departing from the spirit and scope of the invention.

What is claimed is:

1. A 2,4,6-triketo-1,3,5-oxadiazine compound having the formula

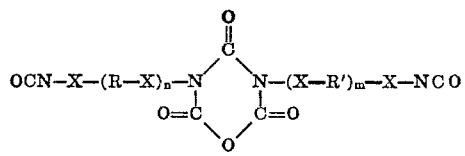

wherein
X is a lower alkylene radical having at least two carbon atoms;
R and R' are the same or different and represent phenylene, methyl substituted phenylene or $C_5$ to $C_6$ cycloalkylene; and
n and m are the same or different and have the value of either 0 or 1.

References Cited

Slotta et al., Berichte, vol. 60, pp. 1021–25 (1927).

HARRY I. MOATZ, Primary Examiner

U.S. Cl. X.R.

117—148, 127, 130, 121; 106—38.2; 260—30.8; 37 R. 448.8 R, 448.8 RS, 453 A, 453 AM, 453 AL, 824 R, 858, 937, 945; 252—8.1; 424—248

UNITED STATES PATENT OFFICE
CERTIFICATE OF CORRECTION

Patent No. 3,748,329     Dated July 24, 1973

Inventor(s) Dietrich Liebsch, Ernst Meisert and Gerhard Stopp

It is certified that error appears in the above-identified patent and that said Letters Patent are hereby corrected as shown below:

Column 3, line 6, delete "1,4-diethylenzene" and insert --1,4-diethylbenzene--

Column 4, lines 33 and 34 after "acylating" insert -- or alkylating--.

Column 7, line 67 and Column 8, line 14, delete "phosphorus" and insert --phosphorous--.

Column 9, line 12, delete "polyhydrice" and insert --polyhydric--; same column, line 33, the formula should read --$(C_nH_{2n}O)$--.

Column 11, line 16, "N, 14;8" should read --N, 14.8--; same column, line 70, delete "82$\mu$" and insert -- 5.82$\mu$ --.

Column 13, line 20, delete "5.38$\mu$" and insert --5.83$\mu$--.

Column 14, line 64, delete "vary" and insert --very--; same column, line 73, "contant" should read --content--.

Column 15, line 31, delete "amendable" and insert --amenable--; same column, line 49, "butyil" should read --butyl--; same column, line 59, the second occurrence of "5.82" should read --5.92--.

Signed and sealed this 25th day of December 1973.

(SEAL)
Attest

EDWARD M. FLETCHER, JR.
Attesting Officer

RENE D. TEGTMEYER
Acting Commissioner of Patents